US010922365B2

(12) United States Patent
Ashoori et al.

(10) Patent No.: US 10,922,365 B2
(45) Date of Patent: Feb. 16, 2021

(54) SECURE SOCIAL CONNECTION VIA REAL-TIME BIOMETRICS AND COGNITIVE STATE COMPARISON

(71) Applicant: INTERNATIONAL BUSINESS MACHINES CORPORATION, Armonk, NY (US)

(72) Inventors: Maryam Ashoori, White Plains, NY (US); Nicholas S. Kersting, Cross River, NY (US); Clifford A. Pickover, Yorktown Heights, NY (US)

(73) Assignee: International Business Machines Corporation, Armonk, NY (US)

(*) Notice: Subject to any disclaimer, the term of this patent is extended or adjusted under 35 U.S.C. 154(b) by 622 days.

(21) Appl. No.: 14/856,194

(22) Filed: Sep. 16, 2015

(65) Prior Publication Data
US 2017/0076000 A1 Mar. 16, 2017

(51) Int. Cl.
G06F 16/9535 (2019.01)
G06Q 10/10 (2012.01)
G06Q 10/06 (2012.01)
G06Q 50/00 (2012.01)

(52) U.S. Cl.
CPC ......... G06F 16/9535 (2019.01); G06Q 10/06 (2013.01); G06Q 10/101 (2013.01); G06Q 50/01 (2013.01)

(58) Field of Classification Search
CPC ......... G06F 17/30528; G06F 16/9535; G06Q 10/06; G06Q 10/101; G06Q 50/01
See application file for complete search history.

(56) References Cited

U.S. PATENT DOCUMENTS

| 8,209,182 | B2 | 6/2012 | Narayanan |
| 8,214,214 | B2 | 7/2012 | Bennett |
| 2009/0234718 | A1 | 9/2009 | Green |
| 2009/0271496 | A1* | 10/2009 | Nakamura ........ G06F 17/30867 709/217 |
| 2011/0138305 | A1 | 6/2011 | Akai et al. |
| 2013/0080169 | A1* | 3/2013 | Harada ................ G10L 25/63 704/249 |
| 2013/0325394 | A1* | 12/2013 | Yuen ................ A61B 5/0002 702/150 |
| 2014/0221866 | A1 | 8/2014 | Quy |

(Continued)

FOREIGN PATENT DOCUMENTS

EP 2779721 A1 9/2014

OTHER PUBLICATIONS

Wang et al., "Biometric Match," AngelList, retrieved on Jun. 19, 2015, https://angel.co/biometric-dating.

(Continued)

Primary Examiner — Mark D Featherstone
Assistant Examiner — Ranjit P Doraiswamy
(74) Attorney, Agent, or Firm — Tutunjian & Bitetto, P.C.; Anthony Curro

(57) ABSTRACT

Methods and systems for matching users include measuring a biometric state of a first user. The biometric state of the first user is matched to a set of biometric states of respective other users. The set of biometric states is limited in accordance with user preferences including how recently each biometric state was measured. A real-time connection is formed with a second user from the limited set of biometric states having a best match.

17 Claims, 7 Drawing Sheets

(56) References Cited

U.S. PATENT DOCUMENTS

| | | | |
|---|---|---|---|
| 2015/0112857 A1* | 4/2015 | Gellis | G06Q 50/01 |
| | | | 705/39 |
| 2015/0347764 A1* | 12/2015 | Cornell | G06F 21/32 |
| | | | 726/28 |
| 2016/0173359 A1* | 6/2016 | Brenner | G06F 19/00 |
| | | | 600/301 |

OTHER PUBLICATIONS

R. Heishman et al., "Using Eye Region Biometrics to Reveal Affective and Cognitive States," Proceedings of the 2004 IEEE Computer Society Conference on Computer Vision and Pattern Recognition Workshops (CVPRW'04), Jun. 2-27, 2004, pp. 69.

C. Ikehara et al., Physiological Measures Used for Identification of Cognitive States and Continuous Authentication, CHU 2010, Apr. 10-15, 2010, pp. 1-4, Atlanta, Georgia, USA. ACM 978-1-60558-930-5/10/04.

Might be Evil—Mobile Secure Computation, Secure Computation on Smartphones, Aug. 2011, pp. 1-5, http://www.mightbeevil.com/mobile/.

N. Kersting, "Fast and Fuzzy Private Set Intersection," May 21, 2014, pp. 1-21.

S. Aman et al., "Identifying Expressions of Emotion in Text," 10th International Conference, TSD 2007, Pilsen, Czech Republic, Sep. 3-7, 2007, pp. 196-205.

\* cited by examiner

SECURE SOCIAL CONNECTION VIA REAL-TIME BIOMETRICS AND COGNITIVE STATE COMPARISON

BACKGROUND

Technical Field

The present invention relates to social networking and, in particular, to forming social connections based on biometric information and cognitive states.

Description of the Related Art

Various mechanisms exist to provide online connections between similar people, allowing them to discover one another and communicate. Platforms include chat applications, dating websites, online games, social media websites, and many others. Such services allow users to find one another based on shared interests, similarity of questionnaire answers, and any other of a variety of matching schemes.

SUMMARY

A method for connecting users includes measuring a biometric state of a first user. The biometric state of the first user is matched to a set of biometric states of respective other users using a processor. The set of biometric states is limited in accordance with user preferences including how recently each biometric state was measured. A real-time connection with a second user is formed from the limited set of biometric states having a best match.

A system for connecting users includes a matching module that includes a processor configured to match a biometric state of a first user to a set of biometric states of respective other users and to limit the set of biometric states in accordance with user preferences including how recently each biometric state was measured. A user interface is configured to form a real-time connection with a second user from the limited set of biometric states having a best match.

These and other features and advantages will become apparent from the following detailed description of illustrative embodiments thereof, which is to be read in connection with the accompanying drawings.

BRIEF DESCRIPTION OF THE SEVERAL VIEWS OF THE DRAWINGS

The disclosure will provide details in the following description of preferred embodiments with reference to the following figures wherein.

DETAILED DESCRIPTION

Embodiments of the present invention measure a user's biometrics and cognitive state as a basis for forming connections between users. For example, if a user has a particular emotional or cognitive state, the present embodiments detect that state and scan for another person who has a similar emotional or cognitive state, establishing a connection between the two users to allow them to have a conversation.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Figure 1:
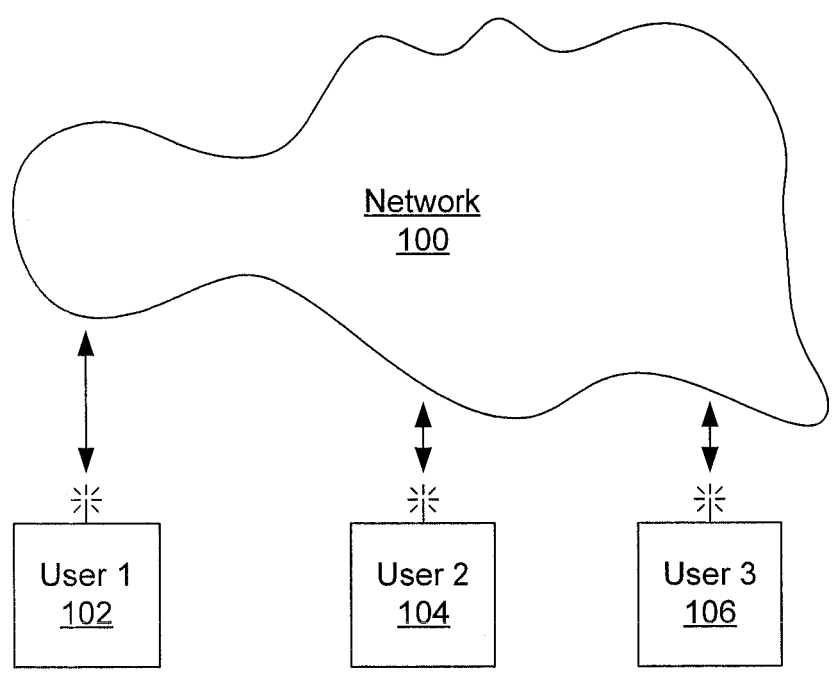
FIG. 1 is a diagram of a set of users in accordance with the present principles.

Referring now to the drawings in which like numerals represent the same or similar elements and initially to FIG. 1, a system of users is shown. A first user device 102 is connected to a network 100 and can thereby communicate with other user devices 104 and 106. The devices have the ability to sense information about the user's physical and cognitive states through the use of one or more sensors. The network 100 may include off-device storage, such as cloud storage or a centralized server, which allows users to store profile and biometric information in a form that is accessible to other users.

Figure 2:
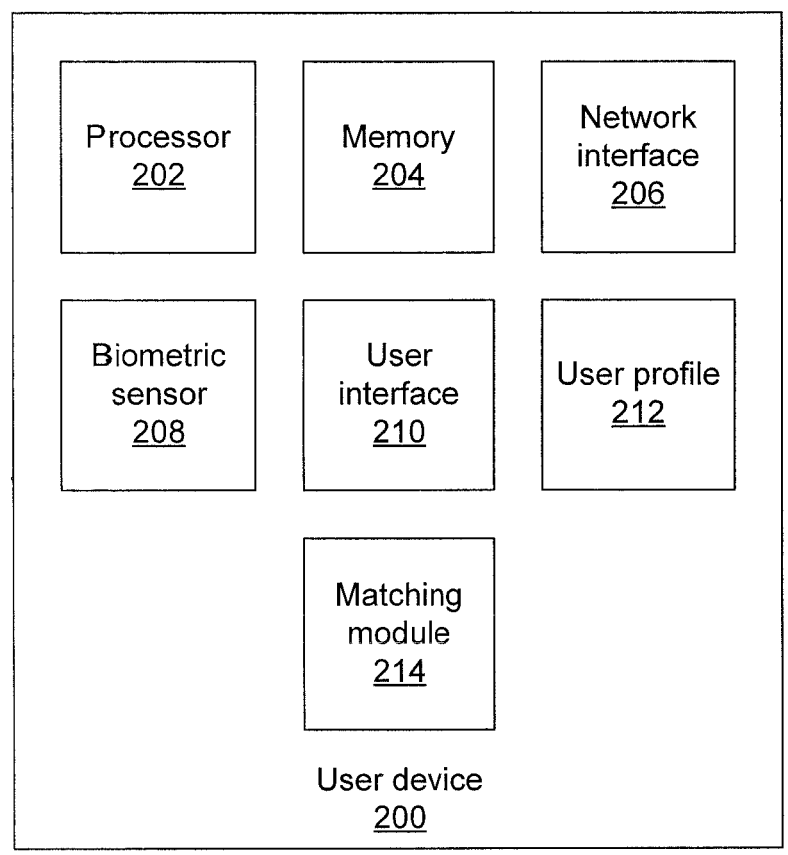
FIG. 2 is a block diagram of a user device for matching users in accordance with the present principles.

Referring now to FIG. 2, additional detail on the user devices is shown. A user device 200 includes a hardware processor 202 and a memory 204. The device 200 itself may be any portable or fixed device such as, e.g., a smartphone, smartwatch, smart outfit, smart eyewear, or a laptop or desktop computer. A network interface 206 communicates with network 100 and may be a wired or wireless connection. Alternatively, the network interface 206 may communicate directly with other devices 200 that are in range. One or more biometric sensors 208 collect information about the user. The measured information may include, e.g., eye-region biometrics such as irises, pupils, eyelids, eye folds, eyebrows, gaze position, fixation number, fixation duration, repeat fixations, blink characteristics, walking characteristics, heartbeat, skin conductivity, sweat levels, peripheral temperature, relative blood flow, pressure sensors, brainwaves, etc. The biometric sensors 208 may be incorporated into the device 200, or they may communicate with the device 200 as one or more peripherals, and the information they produce is stored in memory 204. It should be noted that the term "biometric information" used herein refers to both physiological data as well as certain data regarding the cognitive state of the user.

A user interface 210 allows the user to interact with the device 200 and potentially to communicate with the other users if some form of text or voice input is available. The user interface 210 also provides further information to build information regarding the user's cognitive state. For example, prosody analysis, text analysis, and voice analysis represent ways to obtain cognitive information about the user through the user interface 210. It should be noted that, for example, text analysis may not itself be considered biometric information, but may nonetheless contribute to determining the user's cognitive state. A user profile 212 stored in memory 204 allows the user to configure settings relating to the measurement and communication of biometric information.

The device 200 optionally includes a matching module 214 that accesses other users' biometric state information that is stored in off-device storage. This matching module 214 makes a determination as to a best match for the user of the device 200 and may be implemented as a software application stored in memory 204 and executed on processor

202. Alternatively, the matching module may be implemented as discrete hardware in the form of, e.g., an application specific integrated chip or a field-programmable gate array. In an alternative embodiment, matching may be performed off-device as well at a centralized server on the network 100 or by another device 200.

In the present embodiments, the biometric state of the first user 102 is determined using the biometric sensors 208 of the device 200. An analysis of the state is performed either in the device 200 itself or at a centralized location on the network 100. The first user's biometric state is compared to the biometric states of the second user 104 and the third user 106 who are determined to be in close proximity to the first user 102. Based on the comparative analyses of the biometric states of the three users, a real-time connection may be automatically established between matching users.

In addition to limiting the contact to those users who are close in space, cognitive and biometric states can also be matched to be close in time. So for example, if a user has a particular cognitive state (e.g., they are happy, sad, energized, tired, etc.), the user may press a button on the user interface 212 and the system scans for another user who is currently in a similar mood or in a complementary mood. This may be measured as two users having similar state measurements within a set threshold period of time. The system then establishes a connection between those users. This may also be performed automatically and may be triggered upon reaching a certain state. For example, for a user undergoing psychiatric or medical treatment, certain biometric or cognitive states could be dangerous to the user, prompting a connection with a medical professional. The system therefore establishes criteria (e.g., similar states, complementary states) and selects the user who best matches those criteria (e.g., the most similar or most complementary).

Following another example, if the first user 102 is in the park and looking for a jogging partner who has a similar running speed, the device 200 may scan users within a certain distance. Once a person (e.g., the third user 106) who runs at the same speed is discovered, the system establishes a connection between the two users. In this case, the biometric sensor 208 may use, e.g., gait analysis to make determinations regarding the user's running patterns.

Figure 3:
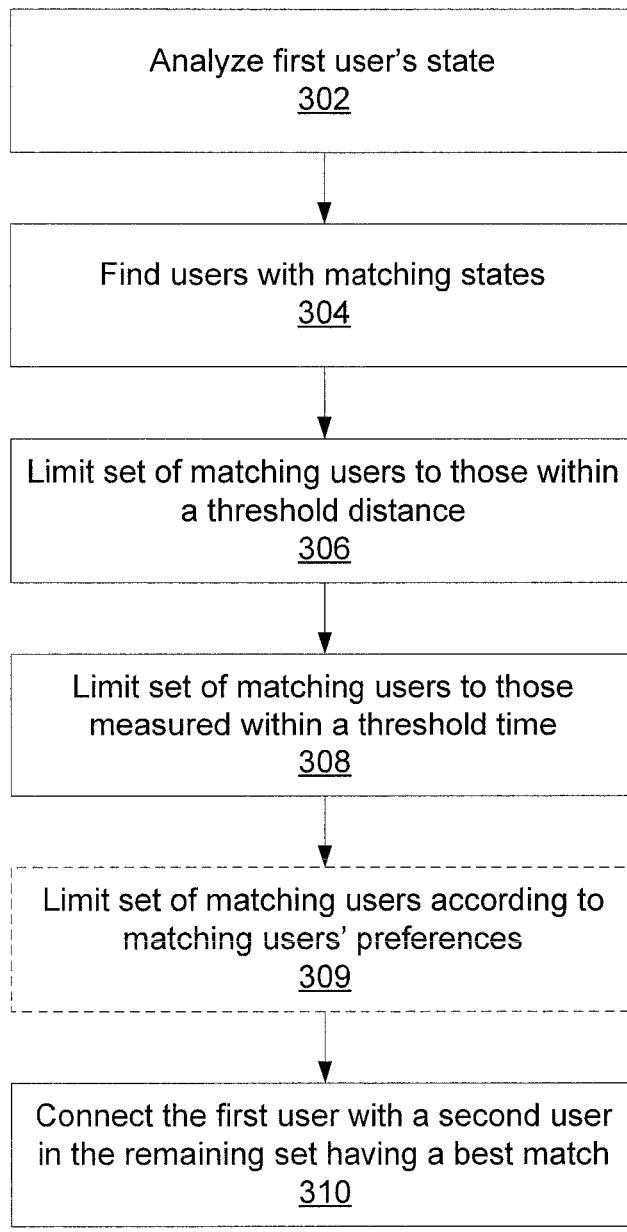
FIG. 3 is a block/flow diagram of a method for matching users in accordance with the present principles.

Referring now to FIG. 3, a method for connecting users is shown. Block 302 analyzes the first user's biometric or cognitive state using the device 200. As noted above, this state can represent any physical or cognitive condition and may be performed automatically or responsive to the user's instruction. Block 304 then finds users having matching states, forming a list of potential matches. Notably, the matches need not be based on exactly the same biometric and cognitive information. One device 200 may have a first set of biometric sensors 208, while a second device 200 may have a different set of sensors 208. Nonetheless, different biometric signals may refer to a single cognitive or biometric state, so that matches can still be made. Block 306 limits the set of matching users to those within a threshold distance, while block 308 limits the set of matching users to those whose states were measured within a threshold time.

It is particularly contemplated that the threshold time should be small. The measurement of a user's state may change rapidly, and the interactions fostered by the present embodiments may occur in real time. This further ensures that both users are awake, near their devices, and actually interested in interaction. In one example, the time threshold may be, e.g, ten seconds, and the distance threshold may be, e.g., ten meters. Blocks 306 and 308 would then limit the matching to only those whose states were measured within those limits. In another example, the distance threshold might be set to infinity, effectively expanding the scope of the search to any user in the world. The thresholds may alternatively be set automatically, taking into consideration the users' geographical locations, the time of day, a special body movement pattern (e.g., a hard workout, running, doing pushups), or a particular cognitive state. Note that the distance threshold need not refer to a physical distance—in one embodiment, the users' distance may be measured in a virtual world that both users are signed into.

Block 309 optionally limits the set of matching users according to the first user's and matched users' preferences. The matched users may have their own time and distance restrictions that are more strict than the first user's thresholds. In addition, the users may have privacy settings or other preferences to restrict contact from certain classes of users. In one example, users of one gender may decline contact from, or limit contact to, users of the opposite gender, in which case block 309 would remove the non-matching users from the set.

Block 310 then establishes a connection between the first user and a second user who is a best match within the thresholds. The quality of the match may be determined by any appropriate metric and will depend on the user's goals and the type of information measured. In one case, the quality of the match may be based on similarity to the first user's state, but quality may equivalently be measured by dissimilarity. Furthermore, the determination may take into account the user's previous states to establish a baseline or trend.

The connection formed in block 310 may be a conversation or any other exchange of information between the two users. For example, one type of connection may involve haptic feedback at the device, where the device buzzes as the first user approaches the second user. Other types of connections may include audio connections, multimedia connections, and text-based connections. As an alternative embodiment, the "best" match may be chosen by the first user based on the remaining set presented via user interface 212. Furthermore, a connection may be established with more than two users simultaneously, placing all of the users in a shared connection.

Figure 4:
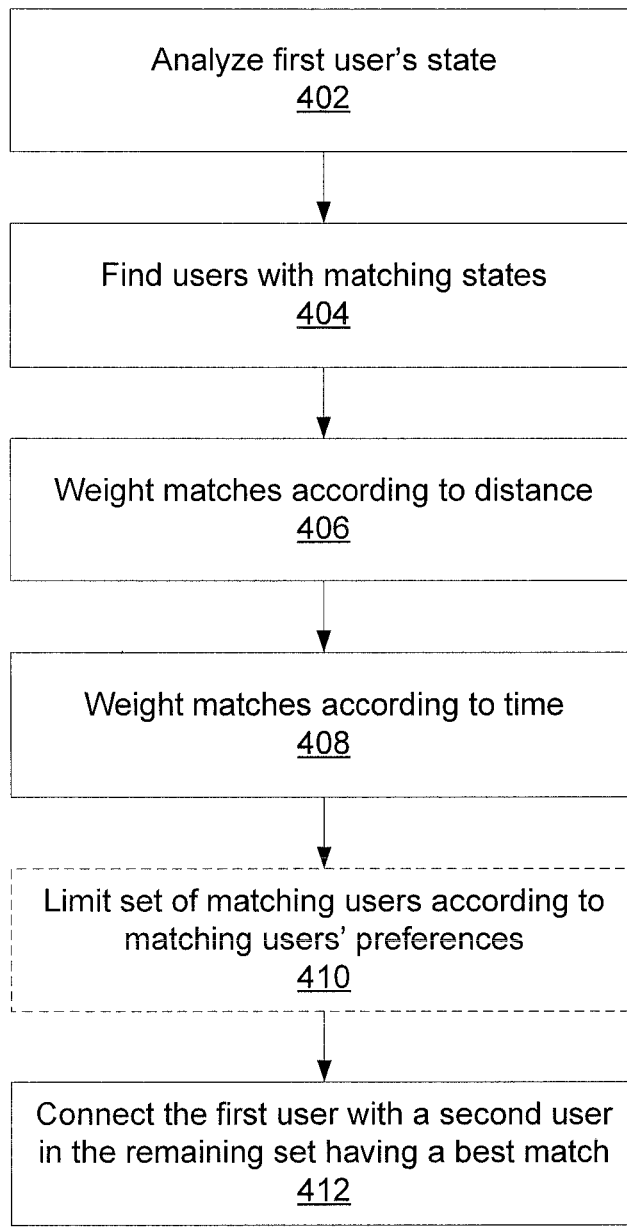
FIG. 4 is a block/flow diagram of a method for matching users in accordance with the present principles.

Referring now to FIG. 4, an alternative matching method is shown. As above, block 402 analyzes the first user's state and block 404 finds users with matching states. In this embodiment, rather than using thresholds to establish hard limit on the set of matching users, each user's match is weighted according to distance (block 406) and time (block 408). Thus, the closest matching user and the user with the most recent state update may have a stronger weight than those who are farther away or who have not had their state measured as recently. Block 410 then optionally limits the set according to other preferences of the first user's or of the matching users and block 412 establishes a connection. This embodiment prevents a user whose thresholds are too stringent from seeing no matches. The first user may set a sensitivity to distance and time as an option to change the effect that, e.g., distance will have on matches.

The present embodiments may be used to form spontaneous, unplanned, beneficial connections between users. For example, consider a user who is in a bad mood. This user looks for someone within, e.g., one mile to go for a coffee to cheer up. The user presses a button on the device 200, causing the device 200 to scan for another person who is currently (time threshold under, e.g., five seconds) feeling happy. The system locates a potential companion for the user and puts them into contact.

Protecting privacy in the present embodiments is of serious importance. Data may be encrypted, particularly using private set intersection for sharing private data. In this form of encryption, users' encrypted data is compared with a protocol that simultaneously notifies both parties of a series of steps that they can perform on their respective, un-encrypted data to discover the parts that they share, but nothing else. The un-encrypted data never leaves the originating device and thus circumvents man-in-the-middle attacks or the need to trust an intermediate authority. Users can then store their encrypted data on off-device storage such as a cloud or in a peer-to-peer hosting service, assured that only those with similar data can partially decrypt the information. The system can perform the mechanics of notifying overlapping users without knowing anything about the specific content of the data.

Figure 5:
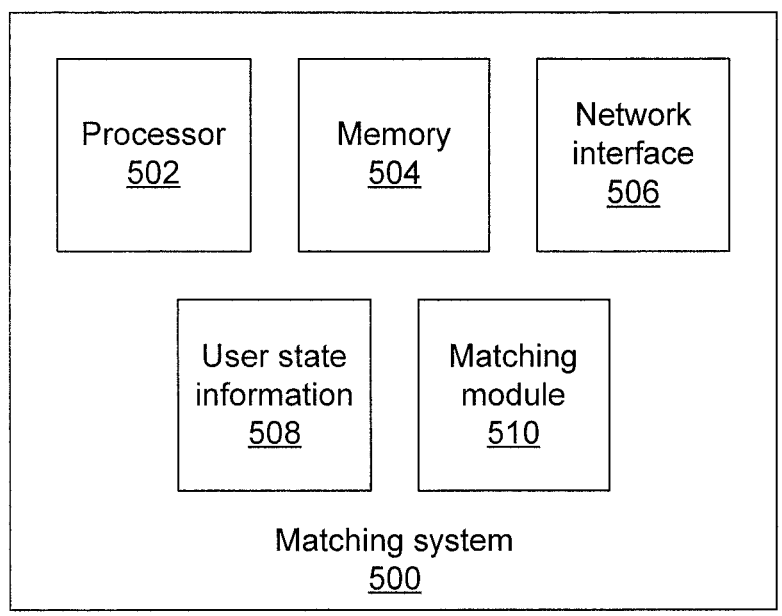
FIG. 5 is a block diagram of a system for matching users in accordance with the present principles.

Referring now to FIG. 5, a matching system 500 is shown. The matching system 500 is used in the network 100 and communicates with user devices 200. In this embodiment, matching is performed at the matching system 500, rather than at the user devices 200. The matching system 500 includes a hardware processor 502 and memory 504. A network interface 506 communicates with network 100 and enables the exchange of information between the matching system 500 and the user devices 200.

The memory 504 stores user state information 508. This user state information 508 may include information regarding users' biometric and cognitive states in raw form or may have a high-level description of the user's state (e.g., describing emotions and activities, rather than specific sensor measurements). A matching module 510 receives requests from user devices 200 and performs matching as described above, taking into account any user preferences regarding time, geography, and privacy that may have been included in the request or stored in user state information 508. The matching module 510 may perform this matching using the processor 502 or may, alternatively, implement the matching function as discrete hardware in the form of, e.g., an application specific integrated chip or a field programmable gate array.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
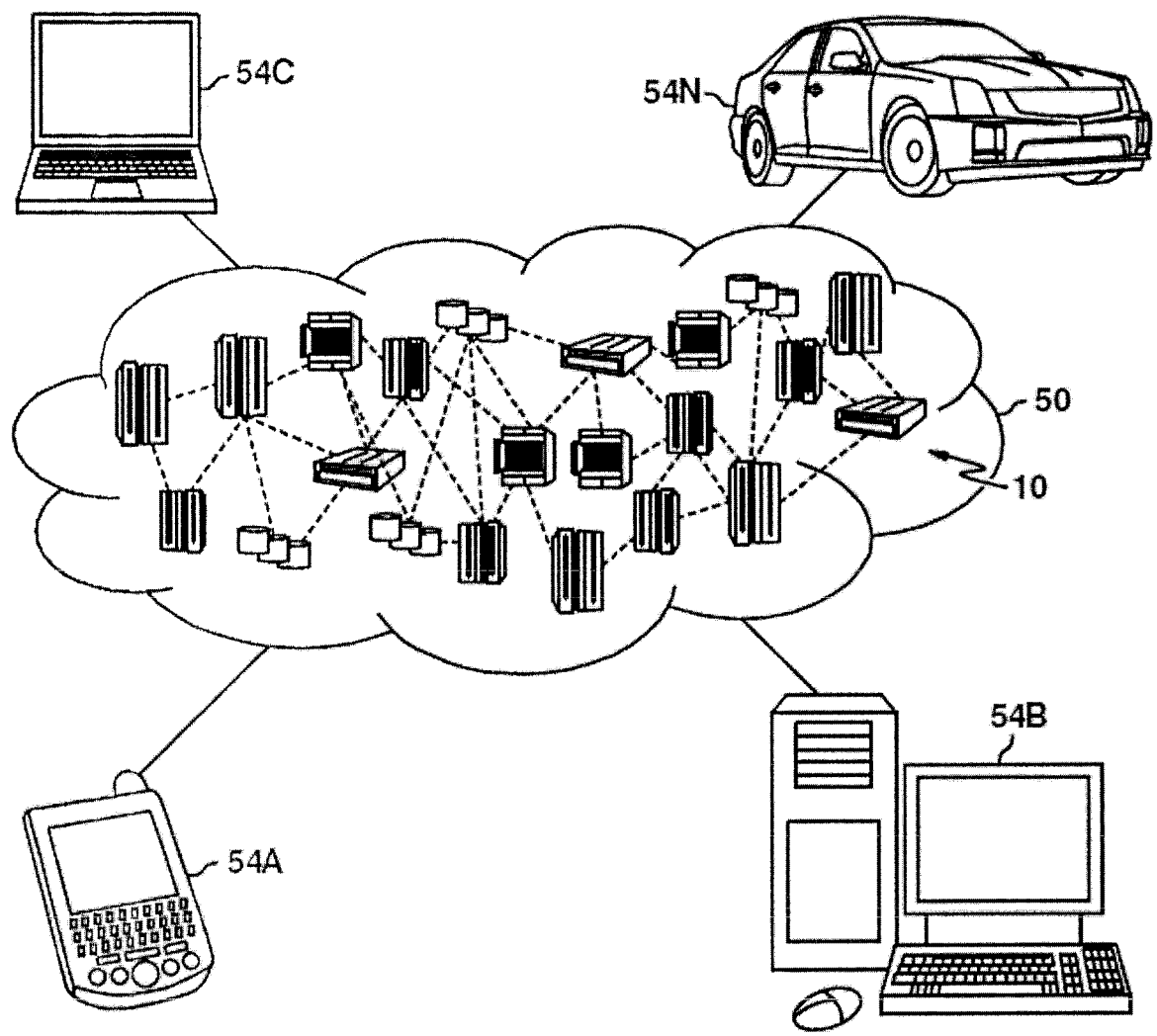
FIG. 6 is a diagram of a cloud computing environment according to an embodiment of the present invention.

Referring now to FIG. 6, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
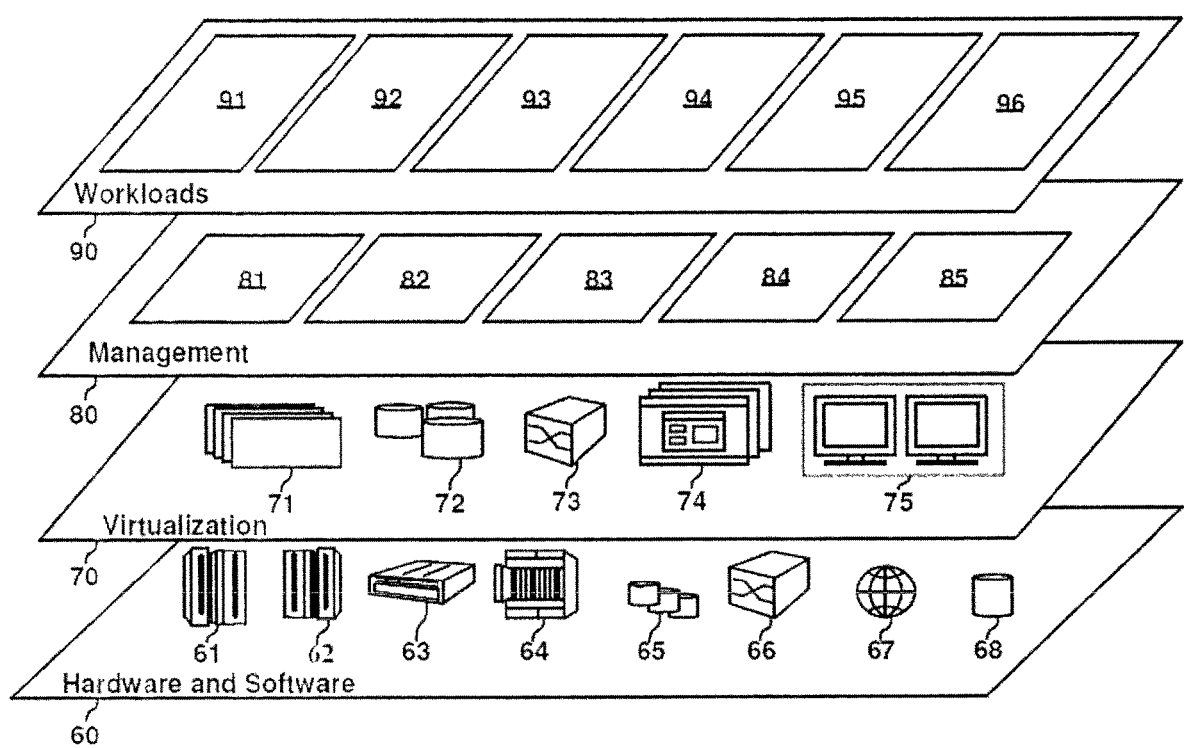
FIG. 7 is a diagram of abstract model layers according to an embodiment of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and social connection via real-time biometrics and cognitive state comparison.

Having described preferred embodiments of secure, unplanned, beneficial social connection via real-time biometrics and cognitive state comparison (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A method for connecting users, comprising:
measuring biometric information to identify a user state, the user state including both a biometric state and a cognitive state, of a first user via at least one biometric sensor which the first user has interaction with;
matching the user state of the first user to a set of user states of respective other users using a processor;
limiting the set of user states in accordance with user preferences including how recently the user state of a first user was measured relative to the time of a measurement of the user state of another user, by excluding users having a user state that was measured at a time in the past greater than a time threshold, and by weighting each user state according to each respective other user's distance from the first user; and
forming a real-time communications connection between a first user device in the possession of the first user and a second user device in the possession of a second user from the limited set of user states having a best match by determining the second user from the limited set of user states having a most similar or most complementary user state to the first user.

2. The method of claim 1, wherein limiting the set of user states comprises excluding users having a distance from the first user greater than a threshold distance.

3. The method of claim 1, wherein forming the connection comprises establishing a real-time communication connection between the first user and the second user.

4. The method of claim 1, wherein forming the connection comprises providing location information of the second user to the first user.

5. The method of claim 1, further comprising limiting the set of user states in accordance with preferences set by the respective other users that exclude the first user.

6. The method of claim 1, wherein matching further comprises matching previous user states of the first user with previous user states of the respective other users.

7. The method of claim 1, further comprising storing the information in a memory and wherein a determination of a cognitive state depends on a prosody analysis, a text analysis, or a voice analysis of a the first user.

8. The method of claim 1, wherein measuring the information comprises obtaining information including physiological data and data regarding a cognitive state of the first user such that the information includes the first user's biometric state and cognitive state in raw form and is stored in memory.

9. A computer readable storage medium comprising a computer readable program for connecting users, wherein the computer readable program when executed on a computer causes the computer to perform the steps of:
    measuring biometric information to identify a user state, the user state including both a biometric state and a cognitive state, of a first user;
    matching the user state of the first user to a set of user states of respective other users;
    limiting the set of user states in accordance with user preferences including how recently the user state of a first user was measured relative to the time of a measurement of the user state of another user, by excluding users having a user state that was measured at a time in the past greater than a time threshold, and by weighting each user state according to each respective other user's distance from the first user; and
    forming a real-time connection with a user device in the possession of a second user from the limited set of user states having a best match by determining a user from the limited set of user states having a most similar or most complementary user state to the first user.

10. A system for connecting users, comprising:
    a matching module comprising a processor configured to match a user state, the user state including both a biometric state stored in raw form in user information and a cognitive state, of a first user to a set of user states of respective other users and to limit the set of user states in accordance with user preferences including how recently the user state of a first user was measured relative to the time of a measurement of the user state of another user, wherein the limitation of the set of user states includes an exclusion of users having a user state that was measured at a time in the past greater than a time threshold, and a weight for each user state according to each respective other user's distance from the first user;
    a network interface configured to communicate with a user device in the possession of another user; and
    a user interface configured to form a real-time connection with a user device in the possession of a second user from the limited set of user states having a best match by determining a user from the limited set of user states having a most similar or most complementary user state to the first user, using the network interface.

11. The system of claim 10, wherein the matching module is further configured to exclude users having a distance from the first user greater than a threshold distance.

12. The system of claim 10, further comprising a network interface configured to establish a real-time communication connection between the first user and the second user.

13. The system of claim 10, wherein the user interface is further configured to provide location information of the second user to the first user.

14. The system of claim 10, wherein the matching module is further configured to limit the set of user states in accordance with preferences set by the respective other users that exclude the first user.

15. The system of claim 10, wherein the matching module is further configured to match previous user states of the first user with previous user states of the respective other users.

16. The method of claim 1, wherein measuring the biometric information comprises obtaining biometric information selected from the group consisting of information about irises, pupils, eyelids, eye folds, eyebrows, gaze position, fixation number, fixation duration, repeat fixations, blink characteristics, walking characteristics, heartbeat, skin conductivity, sweat levels, peripheral temperature, relative blood flow, pressure sensors, brainwaves, and cognitive condition.

17. The method of claim 1, further comprising analyzing the biometric state and a cognitive state of the first user responsive to an instruction from the first user and comparing the respective biometric and cognitive states of the first user to a biometric and cognitive state of at least one other user.

* * * * *